(No Model.)
C. F. HILL.
APPARATUS FOR RAISING WATER BY HORSE POWER.
No. 538,677. Patented May 7, 1895.
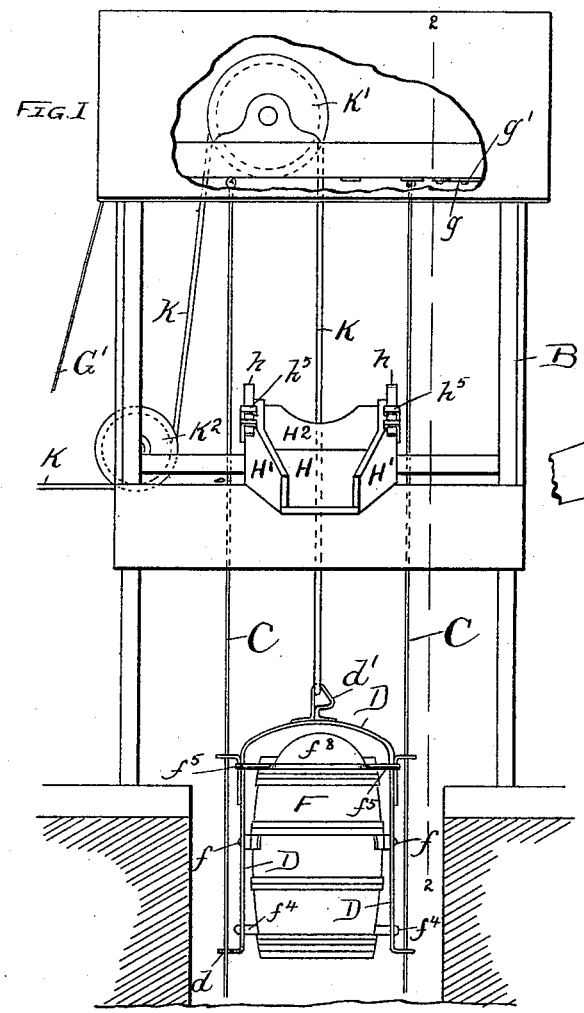
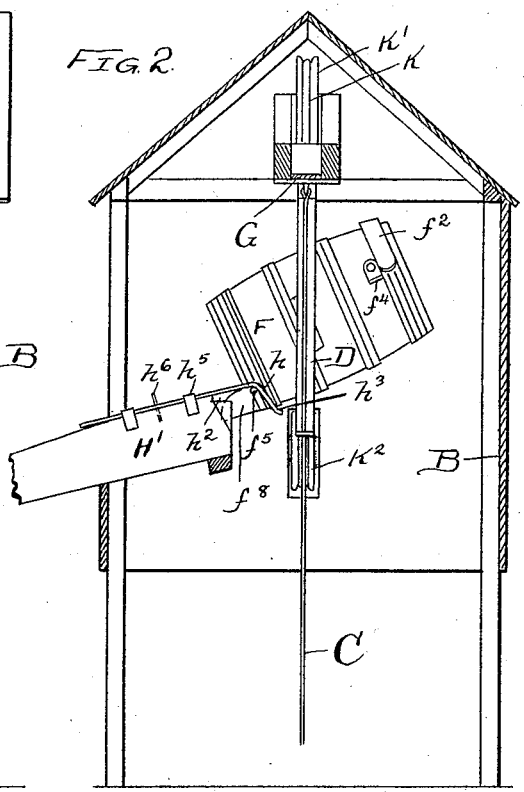
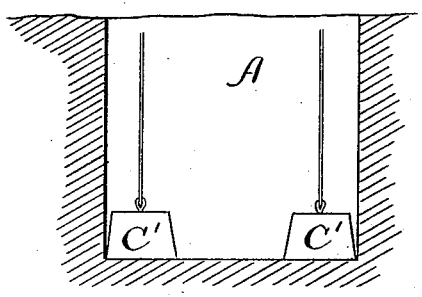
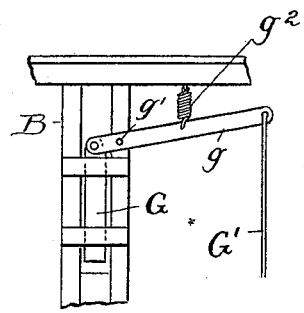
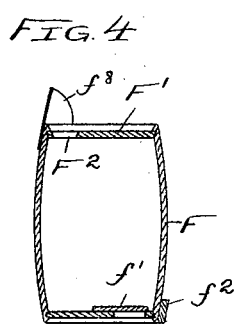
WITNESSES:
Sew. E. Curtis
H. W. Munday
INVENTOR:
Charles F. Hill
By Munday, Evarts & Adcock,
HIS ATTORNEYS.
THE NORRIS PETERS CO., PHOTO-LITHO., WASHINGTON, D. C.

UNITED STATES PATENT OFFICE.

CHARLES F. HILL, OF SPRINGFIELD, WISCONSIN.

APPARATUS FOR RAISING WATER BY HORSE-POWER.

SPECIFICATION forming part of Letters Patent No. 538,677, dated May 7, 1895.

Application filed April 12, 1894. Serial No. 507,240. (No model.)

*To all whom it may concern:*

Be it known that I, CHARLES F. HILL, a citizen of the United States, residing in Springfield, in the county of Walworth and State of Wisconsin, have invented a new and useful Improvement in Apparatus for Raising Water by Horse-Power, of which the following is a specification.

My invention relates to apparatus for raising water by animal power.

The object of my invention is to provide a simple, durable and efficient apparatus by means of which water may be rapidly and easily raised from wells of any depth, and which may be cheaply constructed and easily applied without great cost.

To this end my invention consists in connection with a rope to which the horse may be hitched and suitable pulleys over or around which the rope passes and a suitable frame upon which the pulleys are journaled, of a pair of guides extending from the frame of the apparatus above the well down to the bottom of the well, a sliding frame adapted to move up and down on these guides, a barrel or large bucket pivoted to the sliding frame furnished with a valve at its bottom for admitting the water and with a weight and stops co-operating with the sliding frame to hold the pivoted barrel or pail in its proper upright position while filling and provided also with a bar or projections adapted to strike against stationary cams or projections on the frame to automatically tilt the pivoted barrel or pail to empty the water into the discharge spout.

It also consists in connection with these parts of a spring catch and a hook or projection on the sliding frame adapted to hold the pail in its elevated or emptying position. This spring catch is released by a cord or rope attached to a suitable lever for the purpose of withdrawing the catch and permitting the barrel or pail to again descend into the well.
My invention also consists in the novel devices and novel combinations of parts and devices herein shown and described and more particularly pointed out in the claims.

In the accompanying drawings, which form a part of this specification, and in which similar letters of reference indicate like parts, Figure 1 is a front elevation, partly in section, of a device or apparatus embodying my invention. Fig. 2 is a cross-section taken on the line 2 2 of Fig. 1. Figs. 3 and 4 are detail views of parts hereinafter described.

In the drawings A represents a well.

B represents the frame of the apparatus, the same being preferably in the form of a covered curb or pump house.

C C are the guides extending from the frame above the well to the bottom of the same or to the depth to which it is desired the barrel or pail should descend. These guides may be of any suitable construction, but consist preferably of strong wires. They may be secured in proper position at the bottom of the well by any suitable means, but preferably and most conveniently by attaching each to a weight C′, such as a heavy stone or a piece of iron, which may be readily lowered into the well and placed in proper position; the upper end of the wire guides being then secured to the frame B and stretched tight.

D is the sliding frame adapted to move up and down on the guides C C. It is preferably made of wrought iron curved into the proper shape as indicated in the drawings, and provided with holes $d\ d$ to receive the guide wires C C.

F is the barrel or pail pivoted between the two limbs of the sliding frame D. The pivots $f$ of the barrel or pail are located somewhat above the middle or center of gravity of the barrel, so that the lower or valved end of the barrel will tend to remain lowermost. The barrel or vessel F is furnished with a valve $f'$ in its bottom, which is preferably located at or near the back edge of the barrel, as indicated in the drawings, so that, when the barrel is tipped into the horizontal position for emptying, the water will not tend to splash out at the valve opening. This valve may be of any suitable or ordinary construction. The barrel or vessel F is also provided with a weight $f^2$ located near its lower end and at the rear side and with one or more, preferably two stop projections $f^4\ f^4$ which are adapted to strike against the sliding frame D. These stop projections in connection with the weight at the lower end and rear part or side of the barrel and the sliding frame against which the stops fit, tend always to maintain the barrel in its upright or vertical position and serve to overcome the natural tendency of the barrel to tip into a horizontal position when it first strikes the water on being lowered. The guides C C cause the barrel or vessel F to move truly up and down at the center of the well, and also to prevent it from turning or revolving on its own vertical axis as it is being raised and lowered by the rope, and also to hold the barrel in proper registry with the discharge spout and tilting devices. The barrel or vessel F is provided with a tilting bar $f^5$ secured thereto preferably near its upper end and at its front. This tilting bar when the barrel is raised to near the emptying position strikes against one or more, preferably two, stationary cam or guide fingers $h\,h$, which are preferably attached to the discharge spout H. These fingers $h\,h$ are made inclined at their outer ends, so that they serve not only as cams or projections to tilt the barrel in connection with the tilting bar $f^5$ secured thereto, but also as guides to direct or deflect the mouth end of the barrel properly over and into the discharge spout H. The side pieces H' of the discharge spout should be cut out as shown at $h^2$ to give room or slots for the tilting bar $f^5$ to project in over the end piece $H^2$ of the spout as the barrel is tilted by said bar $f^5$ and the fingers $h$. The guides C C also co-act with the tilting bar $f^5$ and the cam guide fingers $h$ and serve to direct the tilting bar into engagement with said fingers. The inclined or bent ends $h^3$ of the cam guide fingers also serve in connection with the guides C C to limit the extent to which the barrel when in its tilted position may swing back or away from the discharge spout.

The frame D is provided with a cam shaped hook or projection $d'$ which engages a sliding spring catch or pawl G mounted on the frame of the machine and thus serves to automatically hold the barrel or vessel F in its elevated position, so that the weight of the same does not require to be held stationary in this elevated position by the horse. This spring catch or pawl G is released or withdrawn by a lever $g$ pivoted at $g'$ to the frame and to which an operating cord or rope G' is attached, so that the operator on the ground in charge of the horse may conveniently withdraw the pawl. The spring $g^2$ which automatically holds this catch or pawl in position is preferably attached to this lever as indicated in the drawings.

The cam fingers $h\,h$ are preferably made adjustable and so that they may be adjusted in and out of position for engagement with the tilting bar $f^5$ when it is not desired to automatically empty the barrel into the discharge spout. This adjustment is conveniently provided for by mounting the fingers $h\,h$ in suitable guides $h^5$ and fixing them in position by pins $h^6$ passing through holes in the guides as indicated in the drawings. By this means the barrel F may be held suspended by the spring catch in its elevated position and the barrel tilted by hand and a greater or less quantity of water drawn therefrom as may be desired into a pail or other vessel set in the spout.

The barrel or vessel F is preferably provided with a mouth, lip, or supplemental spout $f^8$, which serves to better direct the water into the discharge spout.

The barrel F is preferably provided with a head F' at its upper end and a discharge opening $F^2$ therein near its front edge to prevent the water being emptied or thrown out too suddenly when the barrel is automatically tilted.

K is the rope to which the horse or other animal for raising the water is hitched, and which is secured at one end to the sliding frame D. This pulling rope K passes over a suitable pulley K' located directly above the well on the frame B and around a pulley $K^2$ which is mounted on the frame of the machine at the proper height above the ground to give the desired line of draft for the horse hitched to the end of the rope K.

I claim—

1. In a power water raising apparatus, the combination with guides extending into the well, of a frame sliding up and down on said guides, a valved water vessel or barrel pivoted to said frame, a tilting bar or projection secured to said vessel or barrel, a stationary finger or projection against which the tilting-bar strikes to empty or discharge the contents of the vessel, a rope and pulley for raising and lowering the vessel, said pivoted vessel or barrel being also provided at its lower end with a weight, and a stop projection to maintain the same in an upright position, substantially as specified.

2. In a power water raising apparatus, the combination with guides extending into the well, of a frame sliding up and down on said guides, a valved water vessel or barrel pivoted to said frame, a tilting-bar or projection secured to said vessel or barrel, a stationary finger or projection against which the tilting bar strikes to empty or discharge the contents of the vessel and a rope and pulley for raising and lowering the vessel, said sliding frame having a hook or projection and a spring catch or pawl mounted on the frame and adapted to engage said hook or projection on the sliding frame to hold the same in its elevated position, substantially as specified.

3. In a power water raising apparatus, the combination with guides extending into the well, of a frame sliding up and down on said guides, a valved water vessel or barrel pivoted to said frame, a tilting bar or projection secured to said vessel or barrel, a stationary finger or projection against which the tilting bar strikes to empty or discharge the contents of the vessel, a rope and pulley for raising and lowering the vessel, said sliding frame having a hook or projection and a spring catch or pawl mounted on the frame and adapted to engage said hook or projection on the sliding frame to hold the same in its elevated position, and a lever and rope or line for operating or releasing said spring catch, substantially as specified.

4. The combination with frame B of guides C C extending from said frame B into the well, a sliding frame D adapted to move up and down on and between said guides C C, a valved vessel F pivoted to said sliding frame and provided with a tilting bar $f^5$ near its upper end, a discharge spout H and cam guide fingers $h\ h$ having inclined ends adapted to engage said tilting bar $f^5$, said guide bars having an open space between them to receive and accommodate said vessel F, substantially as specified.

5. The combination with frame B of guides C C extending from said frame B into the well, a sliding frame D adapted to move up and down on and between said guides C C, a valved vessel F pivoted to said sliding frame D and provided with a tilting bar $f^5$ near its upper end, discharge spout H and cam guide fingers $h\ h$ having inclined ends adapted to engage said tilting bar $f^5$, said fingers $h\ h$ being secured to the side pieces of said spout, and said spout being furnished with slots $h^2$ to give room for the tilting bar $f^5$ under said fingers $h\ h$ as the pivot of said vessel passes said guides to tilt the vessel, substantially as specified.

6. The combination with frame B of guides C C extending from said frame B into the well, a sliding frame D adapted to move up and down on and between said guides C C, a valved vessel F pivoted to said sliding frame D and provided with a tilting bar $f^5$ near its upper end, discharge spout H and cam guide fingers $h\ h$ having inclined ends adapted to engage said tilting bar $f^5$, said vessel F being provided with a weight $f^2$ and stop projections $f^4$ adapted to strike against the sliding frame D to hold the vessel F in an upright position, substantially as specified.

7. The combination with frame B of guides C C extending from said frame B into the well, a sliding frame D adapted to move up and down on and between said guides C C, a valved vessel F pivoted to said sliding frame D and provided with a tilting bar $f^5$ near its upper front end, discharge spout H, cam guide fingers $h\ h$ having inclined ends adapted to engage said tilting bar $f^5$, a catch or pawl G mounted on the frame B, and a hook or projection $d'$ on said sliding frame D adapted to be engaged by said catch or pawl G, substantially as specified.

8. The combination with frame B of guides C C extending from said frame B into the well, a sliding frame D adapted to move up and down on and between said guides C C, a valved vessel F pivoted to said sliding frame and provided with a tilting bar $f^5$ near its upper front end, a discharge spout H, cam guide fingers $h\ h$ having inclined ends adapted to engage said tilting bar $f^5$, a catch or pawl G mounted on the frame B, a hook or projection $d'$ on said sliding frame D adapted to be engaged by said catch or pawl G, and a cord and lever for operating said catch or pawl G, substantially as specified.

9. The combination with frame B of guides C C secured thereto and extending into the well, sliding frame D, pivoted vessel F, tilting bar $f^5$, stationary fingers $h\ h$, rope K, pulleys for said rope, and discharge spout H, said vessel F having a weight and stop projection to hold the same in an upright position, substantially as specified.

10. The combination with frame B of guides C C secured thereto and extending into the well, frame D sliding on said guides, pivoted vessel F carried by said frame D, tilting bar $f^5$ secured to said vessel F, stationary fingers $h\ h$ adapted to engage said tilting bar $f^5$, rope K, pulleys for said rope, discharge spout H, said sliding frame D having hook $d'$ and spring catch G for engaging said hook, and a cord and lever for operating said spring catch, substantially as specified.

CHARLES F. HILL.

Witnesses:
 C. H. BURDICK,
 H. A. BURDICK.